Jan. 10, 1950 R. SCOVILLE 2,494,061
STOVE
Filed April 27, 1946
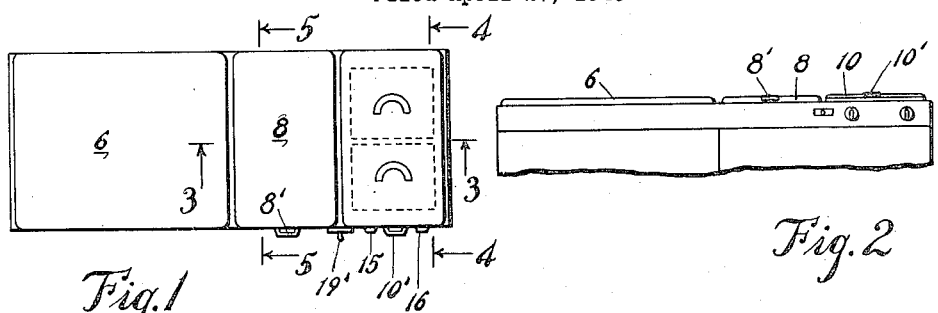
Fig.1    Fig.2
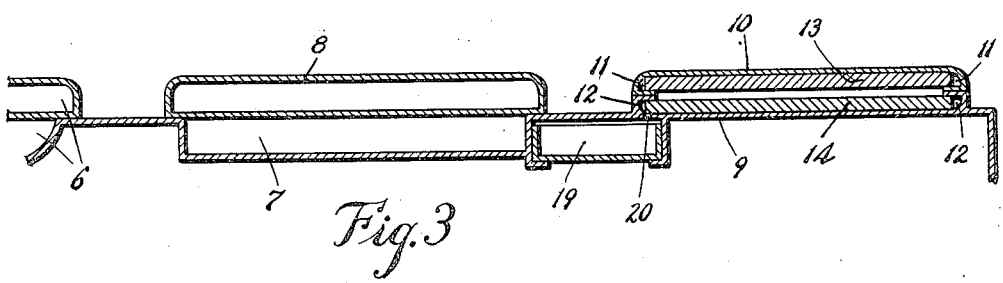
Fig.3
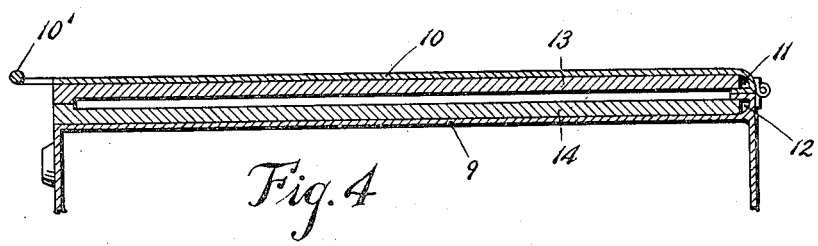
Fig.4
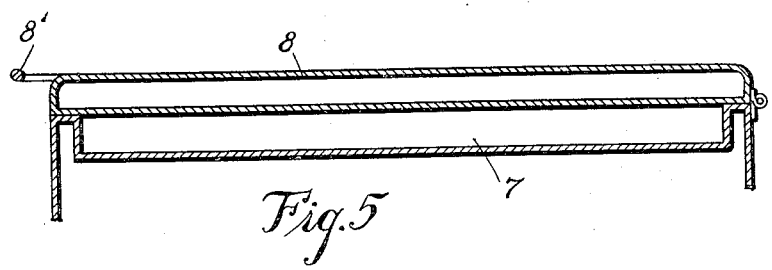
Fig.5
Inventor
Rosalee Scoville
Attorney Patented Jan. 10, 1950

2,494,061

UNITED STATES PATENT OFFICE 2,494,061

STOVE

Rosalee Scoville, Los Angeles, Calif.

Application April 27, 1946, Serial No. 665,589

1 Claim. (Cl. 219—37)

My invention relates to stoves, and more particularly to electrically heated stoves, and it has among its salient objects:

To provide in connection with the top of a stove of the character referred to a griddle area or surface with a lid thereover which can be raised to a vertical position to expose said griddle area for use, and to provide in connection with said griddle area and said lid slideways to receive waffle grids or irons, whereby, when the lid is lowered the two waffle irons are placed together in the usual manner for cooking waffles, said griddle area and said lid being provided with electrical heating means for heating the same, and preferably, I provide the heating means in two portions, whereby only half of the griddle area and the corresponding portion of the lid area are heated, or the whole areas of each can be heated as may be desired; to provide in such a combination two waffle grids or irons which can be inserted in place directly over the griddle area and in the lid and be heated thereby, and which waffle irons can be withdrawn at will and placed in a prepared storage space in the top of said stove, leaving the griddle area ready for use as a grid; to provide in the top of said stove such a convenient storage place for said waffle grids, with cover in harmony with the finish and design of the top of the stove; to provide means as a part of said stove top for catching and holding any grease draining from said griddle area; to provide suitable electric control switches for the heating means; and, in general, to provide some very practical and convenient improvements in electric stoves.

In order to more fully explain my invention, I have illustrated the same on the accompanying sheet of drawings, in which:

Figure 1 is a plan view of the top of a stove embodying my invention;

Figure 2 is a fragmentary front view thereof, only the upper portion of a stove being shown;

Figure 3 is a vertical sectional view through the top portion only of a stove, taken on the line 3—3 of Fig. 1;

Figure 4 is a cross sectional view thereof, taken on the line 4—4, of Fig. 1; and Figure 5 is a cross sectional view thereof taken at the line 5—5, of Fig. 1.

Referring now in detail to the drawings, the general form and design of the stove may be of usual and well known design and arrangement, and for this reason I have only shown in the drawings the top portion of a stove in order to clearly indicate my improvements in connection therewith.

In the drawings, Figs. 1, 2 and 3, the regular burner portion of the stove, with its cover, is designated 6. My specially provided storage space is designated 7, with a hinged top 8, of the same finish inside and outside, said storage space is of a size and form to receive two waffle grids or irons, as hereinafter referred to.

My griddle area, or plate, is designated 9, with a lid 10, adapted to be closed down over said grid or plate 9, when not in use. Said lid is provided at its opposite sides with slideways 11, 11, indicated in Figs. 3 and 4, and at the opposite sides of the griddle area, there are provided similar slideways, 12, 12. These slideways are for the purpose of receiving waffle grids 13 and 14, shown in place, in section in said Figs. 3 and 4. Said waffle grids are heated by their bearing contact with the heated areas of said lid and of said griddle areas, and as means is provided so that only half of the griddle area, and the corresponding area of the lid can be heated, it will be understood that only half of the waffle iron, or all of it can be heated, as may be desired. The electric heating means is indicated by the light broken lines in Fig. 1, and the usual switches, designated 15 and 16, are shown in Figs. 1 and 2. Inasmuch as the electrical heating means is common and well known, it is not considered necessary to show additional drawings for this. It will be understood that half of the griddle area and the corresponding lid area are provided with the heating means controlled by one of the switches, 15 or 16, and the other half of each area is controlled by the other switch, all in the usual and well known manner. The usual temperature-indicating means is indicated at 17 and 18, set in the lid 10, and this is also well known in the art.

I have also provided, in the form of a drawer, designated 19, a grease catching receptacle, with openings, as at 20, from the griddle area, and seen in Fig. 2, and which receptacle can be withdrawn at will for the purpose of emptying it. Said drawer or receptacle 19 is provided with a handle 19', Fig. 1. The lids or covers 8 and 10 are also provided with suitable handles, as 8' and 10' for raising and lowering them at will.

The slideways 11, 11, in the lid or cover 10, and also in the griddle area, as at 12, 12, are only in the opposite sides of each, and in the rears thereof, as will be clear from the showing.

Thus I have provided a very simple and practical means of having two waffle grids which can be slipped into slideways over the griddle area and in the lid or cover therefor, and used as waffle irons in the usual way, and which can be withdrawn as easily and placed in a storage space in the top of the stove, adjacent the place of use. I have also provided a construction and arrangement wherein the griddle area or plate, in addition to be used at will in the usual manner, becomes the heating means for a waffle iron placed thereon in the manner indicated.

I do not, however, limit my invention to the details of construction and arrangement shown for explanatory purposes, knowing that many changes can be made without departing from the spirit of my invention, and I limit my invention only by the hereto appended claim forming a part of this specification.

I claim:

In a stove structure, the combination of a grid plate and a cover therefor, with electric heating means therefor, whereby said grid plate can be used as a grid with cover therefor, said cover and said grid plate both having slideways provided at their opposite inner sides to receive waffle irons, and waffle irons designed to slide into said slideways in said cover and said grid plate, respectively to be held and opened and closed as said cover is raised and lowered.

ROSALEE SCOVILLE.

REFERENCES CITED

The following references are of record in the file of this patent:

UNITED STATES PATENTS

| Number | Name | Date |
| --- | --- | --- |
| 796,593 | Mohan | Aug. 8, 1905 |
| 1,587,788 | Morley | June 8, 1926 |
| 1,678,690 | Connell | July 31, 1928 |
| 2,225,176 | Lewis et al. | Dec. 17, 1940 |